(12) United States Patent
Jayaraman et al.

(10) Patent No.: US 11,556,386 B2
(45) Date of Patent: Jan. 17, 2023

(54) SYNTHESIZING A RESOURCE REQUEST TO OBTAIN RESOURCE IDENTIFIER BASED ON EXTRACTED UNIFIED MODEL, USER REQUIREMENT AND POLICY REQUIREMENTS TO ALLOCATE RESOURCES

(71) Applicant: Telefonaktiebolaget LM Ericsson (publ), Stockholm (SE)

(72) Inventors: Mahesh Babu Jayaraman, Bangalore (IN); Ganapathy Raman Madanagopal, Bengaluru (IN); Ashis Kumar Roy, Durgapur (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 142 days.

(21) Appl. No.: 16/647,649

(22) PCT Filed: Sep. 18, 2017

(86) PCT No.: PCT/IN2017/050407
§ 371 (c)(1),
(2) Date: Mar. 16, 2020

(87) PCT Pub. No.: WO2019/053735
PCT Pub. Date: Mar. 21, 2019

(65) Prior Publication Data
US 2020/0264934 A1    Aug. 20, 2020

(51) Int. Cl.
*G06F 9/50* (2006.01)
(52) U.S. Cl.
CPC .... *G06F 9/5027* (2013.01); *G06F 2209/5013* (2013.01)
(58) Field of Classification Search
None
See application file for complete search history.

(56) References Cited

U.S. PATENT DOCUMENTS 10,142,702 B2 * 11/2018 Vaculin ................ G06K 9/0061
10,380,198 B2 *  8/2019 Xu ........................ H04L 67/02
(Continued)

OTHER PUBLICATIONS

International Search Report and Written Opinion of the International Searching Authority for PCT International Application No. PCT/IN2017/050407 dated Nov. 23, 2017.
(Continued)

*Primary Examiner* — Meng Ai T An
*Assistant Examiner* — Zujia Xu
(74) *Attorney, Agent, or Firm* — Sage Patent Group

(57) ABSTRACT

Resource allocation problems involve identification of resource, selection by certain criteria and offering of resources to the requester. Identification of required resources may involve matching the type of resource, selecting based on user requirements and policy criteria, and offering the resource through an assignment system. An apparatus and a method are provided that enable identification and selection of resources. The method includes receiving a resource allocation request for the allocation of a resource, the resource allocation request specifying a set of user requirements. The method includes receiving an operator policy associated with the resource, the operator policy including one or more policy requirements. The method includes synthesizing a resource request based on the resource allocation request and the operator policy. Synthesizing the resource request based on the resource allocation request and the operator policy comprises combining the user requirements with the one or more of the policy requirements.

13 Claims, 13 Drawing Sheets

(56) References Cited

U.S. PATENT DOCUMENTS

| | | | | |
|---|---|---|---|---|
| 2004/0078495 | A1* | 4/2004 | Mousseau | G06F 9/44 710/1 |
| 2005/0004757 | A1* | 1/2005 | Neeman | G01C 21/3423 701/414 |
| 2011/0022697 | A1* | 1/2011 | Huh | G06F 16/958 709/224 |
| 2013/0246208 | A1 | 9/2013 | Jain et al. | |
| 2014/0359430 | A1* | 12/2014 | Jacob | G06T 13/00 715/236 |
| 2015/0295939 | A1* | 10/2015 | Rissanen | H04L 63/10 726/1 |
| 2016/0205037 | A1 | 7/2016 | Gupte et al. | |
| 2016/0269319 | A1* | 9/2016 | Wise | H04L 47/823 |
| 2017/0083354 | A1* | 3/2017 | Thomas | G06F 9/5011 |
| 2017/0109333 | A1* | 4/2017 | Freed | G16H 50/30 |
| 2019/0191004 | A1* | 6/2019 | Nakagoe | G06F 15/00 |
| 2020/0076709 | A1* | 3/2020 | Stenberg | H04W 24/02 |

OTHER PUBLICATIONS

Haase et al., "Semantic Technologies for Enterprise Cloud Management," International Semantic Web Conference ISWC 2010: The Semantic Web—ISWC 2010 pp. 98-113.

FluidOps, "Semantic technologies create transparency in the data center," https://www.fluidops.com/en/products/edatacenteranalyzer/features?f=data-center-ontology, Jul. 28, 2016; including google translation of the document in English.

Press release from: fluid Operations, "eDataCenterAnalyzer Increases Transparency in Data Centers," Jun. 30, 2016 Walldorf, Germany, published on openPR.

European Search Report for European Patent Application No. 17924919.8 dated Aug. 18, 2020.

Lymberopoulos et al., "NOVI Tools and Algorithms for Federating Virtualized Infrastructures," In: Álvarez F. et al. (eds) The Future Internet. FIA 2012. Lecture Notes in Computer Science, vol. 7281. Springer, Berlin, Heidelberg, pp. 213-224.

* cited by examiner

SYNTHESIZING A RESOURCE REQUEST TO OBTAIN RESOURCE IDENTIFIER BASED ON EXTRACTED UNIFIED MODEL, USER REQUIREMENT AND POLICY REQUIREMENTS TO ALLOCATE RESOURCES

CROSS REFERENCE TO RELATED APPLICATION

This application is a 35 U.S.C. § 371 national stage application of PCT International Application No. PCT/IN2017/050407, filed on Sep. 18, 2017, the disclosure and content of which is incorporated herein by reference in its entirety.

TECHNICAL FIELD

Disclosed are embodiments related to resource allocation.

BACKGROUND

Providers of cloud services (e.g., public/private) currently offer resources based on interfaces (e.g., application programming interfaces (APIs), command-line interfaces (CLIs), graphical-user interfaces (GUIs), Representational State Transfer (RESTful) interfaces). Example interfaces include interfaces like OpenStack and Amazon Web Services (AWS). These respective cloud technologies have their own database of resource information, either discovered or provisioned using some means. Also, such cloud providers, when they want to control access to resources due to their policies, use static policy filters and approaches based on configuration files. Often these filters and configuration files are provided in every node that offers resources and/or capabilities.

For example, the Nova OpenStack project allocates computing resources during provisioning (e.g. during VM allocation for a Create-VM operation) based on a plurality of policies/filters which considers only the capabilities/capacities from a Nova database. Also, policy-based solutions in OpenStack are currently very limited. For example, such solutions are specific to a single type of resource (e.g., either for compute or storage or network), and do not cover areas such as management areas like facility administration. Similar issues exist in other domains, such as e.g. resource allocation in an Intelligent Transportation System (ITS) domain.

SUMMARY

Currently, rapidly increasing demand for cloud services, combined with users' demands for flexibility during resource allocation, creates a challenging problem. Accordingly, improved resource allocation technologies are needed.

There exist challenges for managing and allocating cloud resources by an operator in order to fulfill users' demands while also adhering to operator or facility policies.

Cloud operators are currently heavily limited. Existing solutions fail to allow for many important needs. For example, administrative policies over facility properties like floor restrictions (e.g., policy to restrict using compute nodes for creating virtual machines (VMs) on the 4th floor), cooling zones (e.g., policy to restrict creating new VMs in cooling zone A), and other such policies related to facility maintenance, are important for operators to maintain operator control and to fulfill other needs. Operators may also wish to restrict users/tenants to certain types of resources based on their subscription, and administrative policies to achieve this are likewise important (e.g., policy to restrict a certain class of user, for example based on subscription, from accessing a generation of machines or certain types of machines). Operators may also wish to retain control over the placement of workloads (e.g., VM, Container, Application). Operators may also wish to restrict usage of resources based on Network Interface Card (NIC) type, Graphics Processing Unit (GPU) type, and other similar components or sub-components of a resource. Existing solutions that use hard-coded policy filters result in a rigid system that severely limits cloud operators. These sorts of administrative policy controls are not enabled by existing solutions. To the extent some limited control is available, it is practiced in an ad-hoc manner generally outside of the cloud (e.g., Nova scheduler) operator policies, and relies on hard-coding and tweaking inside the cloud operator software eco-system, when there is some maintenance to be carried out.

For Network Functions Virtualization (NFV) based infrastructure, similar policy control would be useful. Further, for Central Office Re-architected as a Datacenter (CORD) (e.g., for telecom service providers that offer cloud-based infrastructure and services), which takes varying workloads (e.g., NFV, Machine Learning), such policy control is also useful. For example, it is difficult for telecom service providers to operate infrastructure in the way that Google, Amazon, and other cloud operators handle their infrastructure. In such systems, it is very important to provide such policy control, including dynamic user requirements and policies (e.g., automating such control through programmatically controllable and manageable infrastructure).

FIG. 1 illustrates an exemplary datacenter layout. Different types of policies that operators may want to manage and/or control are shown in FIG. 1. For example, data center 100 includes four floors 102 (fourth floor), 104 (third floor), 106 (second floor), and 108 (first floor). Some resources within data center 100 are only available on certain floors. For example, Seagate SSD 112 and Mellanox NIC Segment 110 are on floor 102; AMD GPU 114 is on floor 104; 40G SR-IOV NIC 124 is on floor 106; and machines with manufacturing dates older than 2010 (represented by reference numeral 126) and 1 TB RAM machines 128 are both on floor 108. Other resources span a proper subset of the floors. For example, Broadwell 120 spans floors 102 and 104; HP 2U Blade Servers 116 spans floors 104 and 106; and HDD 8000-RPM Segment 118 spans floors 104, 106, and 108. Other resources, such as Intel Xeon Processor 122 span all the floors.

Existing systems such as OpenStack present several technical challenges. For example, statically designed filters (which existing systems force operators to use to handle policy requirements) deal only with certain types of resource capabilities. Existing systems also employ a rigid architecture for extending or programming differently such capabilities. These systems do not allow, or do not easily allow, operators to change the policies on a per-tenant or per-user basis when a new type of evolving resource capability needs to be exposed for policy setting. For example, a set of configuration files for each resource (e.g., with a comma-separated list) may be required by existing solutions, such resource files manually spread out across all the compute nodes. Maintaining and managing these configuration files is an intensive task and it is not a scalable and extendable approach. Furthermore, OpenStack, as an example, is directed only to compute or storage resource aspects, and does not include other useful properties such as facility-related policies.

Further challenges include resource identification in other domains (e.g., besides data centers). The above-described needs for resource selection, and matching for user requirement and for domain-operator policies, are applicable in other domains such as an Intelligent Transportation System (ITS) and Logistics. For example, one such area includes bus scheduling in an ITS. A resource operator may want to restrict certain types of buses by model or by seating capacity or trip length. These kinds of resource allocation problems are similar as that of data center resource identification (e.g., for VM allocation or for container placement).

There are also applications related to the Internet of Things (IoT), where there is a need to identify suitably constrained devices by their capabilities (e.g., to place transformation and micro-service functions). IoT-related applications may arise, for example, due to the convergence of multiple technologies that underlie a given IoT use case.

Accordingly, an extendable system that avoids the imperative filters largely enhances an operator's capability to administer or deal with data center operations. Embodiments are described below showing applicability to domains including Infrastructure as a Service (IaaS) (e.g., OpenStack for VMs, Kubernates for containers) and ITS (e.g., bus scheduling).

Embodiments provide an enhanced cloud system for managing operator and/or tenant admin policies, e.g., by developing a unified resource interface for multiple resource databases. In embodiments, cloud operator polices are automatically fused.

Embodiments provide a system capable of handling multiple disparate data sources, including, for example, facility, power, cooling, and other aspects (e.g., Ceilometer) in addition to usual (e.g. Nova) resource database.

Embodiments provide for advantages such as eliminating imperative coding for policy filters, enabling resource querying based on any property in the model, and enabling a method to fuse a user's resource allocation request with the policies of the operators of the underlying resources.

Embodiments also provide for advantages such as enabling cloud operator to seamlessly fuse policy that enables many new administrative concerns (e.g., integrating data from different administrative concerns embedded with policy fusion, such as computing resources combined with the facility aspect of the computing resources), which leads to optimization of the use of resources in the data center thereby reducing operational expenditures.

In embodiments, ITS and other operators also get the unique advantage of policy integration through a request synthesis framework. Embodiments also improve customer experience (e.g., for resource selection, conditional selections). Embodiments provide a novel extensible fusion framework to automatically generate/synthesize resource requests for resource allocations. Embodiments provide a way to fuse user requirements with operator/tenant policies. Embodiments enable seamless query for resources specifying conditions that match across the databases (from different departments) based on the unified view. Embodiments enable applications like VM allocation to honor operator/tenant policy without any custom extension for resource specific filtering using imperative code implementations.

Embodiments can be applied on other domains like ITS and Constrained IoT environments for resource allocation/identification problems.

According to one aspect, a method is provided. The method includes receiving a resource allocation request for the allocation of a resource, the resource allocation request specifying a set of user requirements. The method further includes receiving an operator policy associated with the resource, the operator policy including one or more policy requirements. The method further includes synthesizing a resource request based on the resource allocation request and the operator policy. Synthesizing the resource request based on the resource allocation request and the operator policy comprises combining the user requirements with the one or more of the policy requirements.

In some embodiments, the method further includes issuing the synthesized resource request to obtain resource identifiers identifying resource instances that satisfy the synthesized resource request; receiving the resource identifiers; and allocating one of the resource instances in response to the resource allocation request. In some embodiments, issuing the synthesized resource request to obtain resource identifiers includes processing the synthesized resource request into a resource query and executing the resource query. In some embodiments, issuing the synthesized resource request to obtain resource identifiers includes directly executing the synthesized resource request.

In some embodiments, the synthesized resource request to obtain resource identifiers comprises a computer program. In some embodiments, synthesizing the resource request based on the resource allocation request and the operator policy includes generating a user-request fragment. Generating the user-request fragment includes extracting the user requirements from the resource allocation request and composing the extracted user requirements. In some embodiments, the user requirements include one or more of attributes, operations, and conditions related to the requested resource. In some embodiments, synthesizing the resource request based on the resource allocation request and the operator policy includes generating a policy-definition fragment. Generating the policy-definition fragment includes extracting the policy requirements from the operator policy and composing the extracted policy requirements.

In some embodiments, the policy requirements depend at least in part on the resource allocation request. In some embodiments, the policy requirements include one or more of attributes and conditions related to the requested resource. In some embodiments, the synthesized resource request is based on one or more of the user-request fragment and the policy-definition fragment. In some embodiments, the method further includes generating a unified model representing a plurality of resources, the unified model including one or more adapters acting as intermediaries to one or more data sources. In some embodiments, the resource includes one or more resource components within a data center, the one or more resource components including virtual machines. In some embodiments, the resource comprises one or more resource components within an intelligent transport system, the one or more resource components including buses.

According to another aspect, a device is provided. The device is adapted to receive a resource allocation request for the allocation of a resource, the resource allocation request specifying a set of user requirements. The device is further adapted to receive an operator policy associated with the resource, the operator policy including one or more policy requirements. The device is further adapted to synthesize a resource request based on the resource allocation request and the operator policy. Synthesizing the resource request based on the resource allocation request and the operator policy includes combining the user requirements with the one or more of the policy requirements.

In some embodiments, the device is further adapted to perform the method according to any of the embodiments of the above-described aspect.

According to another aspect, a device is provided. The device includes a receiving module configured to receive a resource allocation request for the allocation of a resource, the resource allocation request specifying a set of user requirements. The receiving module is further configured to receive an operator policy associated with the resource, the operator policy including one or more policy requirements. The device further includes a synthesizing module configured to synthesize a resource request based on the resource allocation request and the operator policy. Synthesizing the resource request based on the resource allocation request and the operator policy includes combining the user requirements with the one or more of the policy requirements.

According to another aspect, a computer program is provided. The computer program includes instructions which, when executed on at least one processor, causes the at least one processor to carry out the method according to any one of the embodiments of the above-described aspect.

According to another aspect, a carrier is provided. The carrier includes the computer program according to the above-described aspect. The carrier is one of an electronic signal, optical signal, radio signal, or computer readable storage medium.

BRIEF DESCRIPTION OF THE DRAWINGS

The accompanying drawings, which are incorporated herein and form part of the specification, illustrate various embodiments.

DETAILED DESCRIPTION

Figure 1:
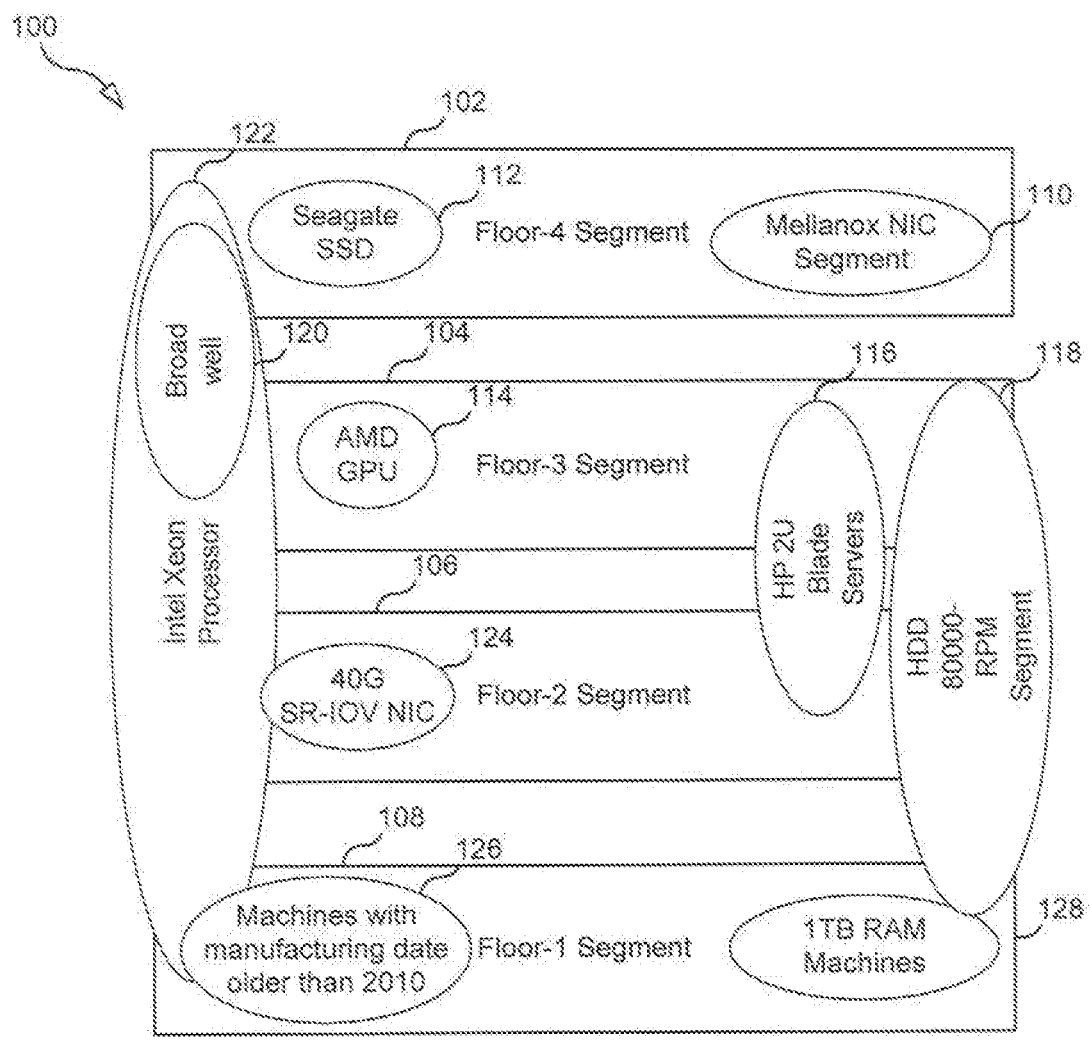
FIG. 1 illustrates a system according to some embodiments.

Embodiments provide a request synthesis framework which fuses a user's resource allocation request and policies to synthesize a resource request that integrates multiple resources (e.g., data sources) together with requirements and policy seamlessly. In embodiments, the framework can generate a resource request, such as in the form of query/program (e.g. SPARQL Protocol and RDF Query Language (SPARQL) or generated code or a descriptive specification for further processing). In embodiments, this eliminates the need for the hand-coded, layered and rigid approach currently used, and also creates an automatically extensible system that can be extended with new resources (e.g., data sources) and new types of policies. In embodiments, data from different and disparate systems that manage data center resources are automatically integrated and contextualized using a unified-model approach to enable policy fusion seamlessly during resource-request processing.

In embodiments, the request synthesis framework may take as inputs user input (e.g., user resource allocation request), operator input (e.g., operator and/or tenant policy), design input (e.g., unified model that synthesizes attributes, conditions, and/or operations), and may generate (a.k.a. synthesize) as output a resource request.

Embodiments may include a unified view (a.k.a. model), and the unified view may manage data from multiple disparate systems. These multiple disparate systems may include, for example, computing resources such as servers (e.g., OpenStack Nova); they may also include facility resources, such as floors, tagged areas, and cooling zones of resources. In some embodiments, these resources may be related (e.g., the computing resources may be physically located within the facility resources). The unified view handles varying vocabularies used for resources, and is able to map data from disparate systems into a single data model. The unified view may be available for applications (e.g., external or client applications) to query/request data from respective data sources. The unified view may be exposed to such applications through a unified interface.

The unified interface may have access to the unified view, and may have access to the resources represented by the unified view. The unified interface may be a unified query representation, such as SPARQL. The unified interface may also be a unified program representation. In embodiments, the unified program representation may identify input data sources, process components to search/match, and output results. The unified program representation may include a combination of SQL queries from different databases that gives the short-listed resources as a program (e.g., PL/SQL program).

Embodiments provide a synthesizer. For example, given a user request for a resource (e.g., related to IaaS), and corresponding tenant/operator policy (e.g., policies related to the requested resource), the synthesizer may synthesize (i.e., fuse) the user request and the corresponding tenant/operator policy into the unified query representation and/or unified program representation. Synthesizing the user request and the corresponding tenant/operator policy includes extracting attributes (e.g., properties used in a user requirement found in the user request and/or found in the tenant/operator policy's policy specification), conditions (e.g., conditional statements in the user requirement and/or the policy specification), and operation(s) (e.g., a user performed operation that may have to adhere to a policy, such as VM-create). The synthesized representation results in a unified request which is passed over the unified interface. In embodiments, the unified interface may return resources that match the user request and corresponding tenant/operator policy.

Operator policies may include, for example, cloud operator level settings. Tenant policies may include, for example, enterprise level subscriptions. User policies may include, for example, per-user (a.k.a. user-specific) policies. As used herein, operator policies, or just policies, may encompass operator policies, tenant policies, and/or user policies. In embodiments, some or all of these policy requirements may be selected and composed into extracted policy requirements.

Figure 2:
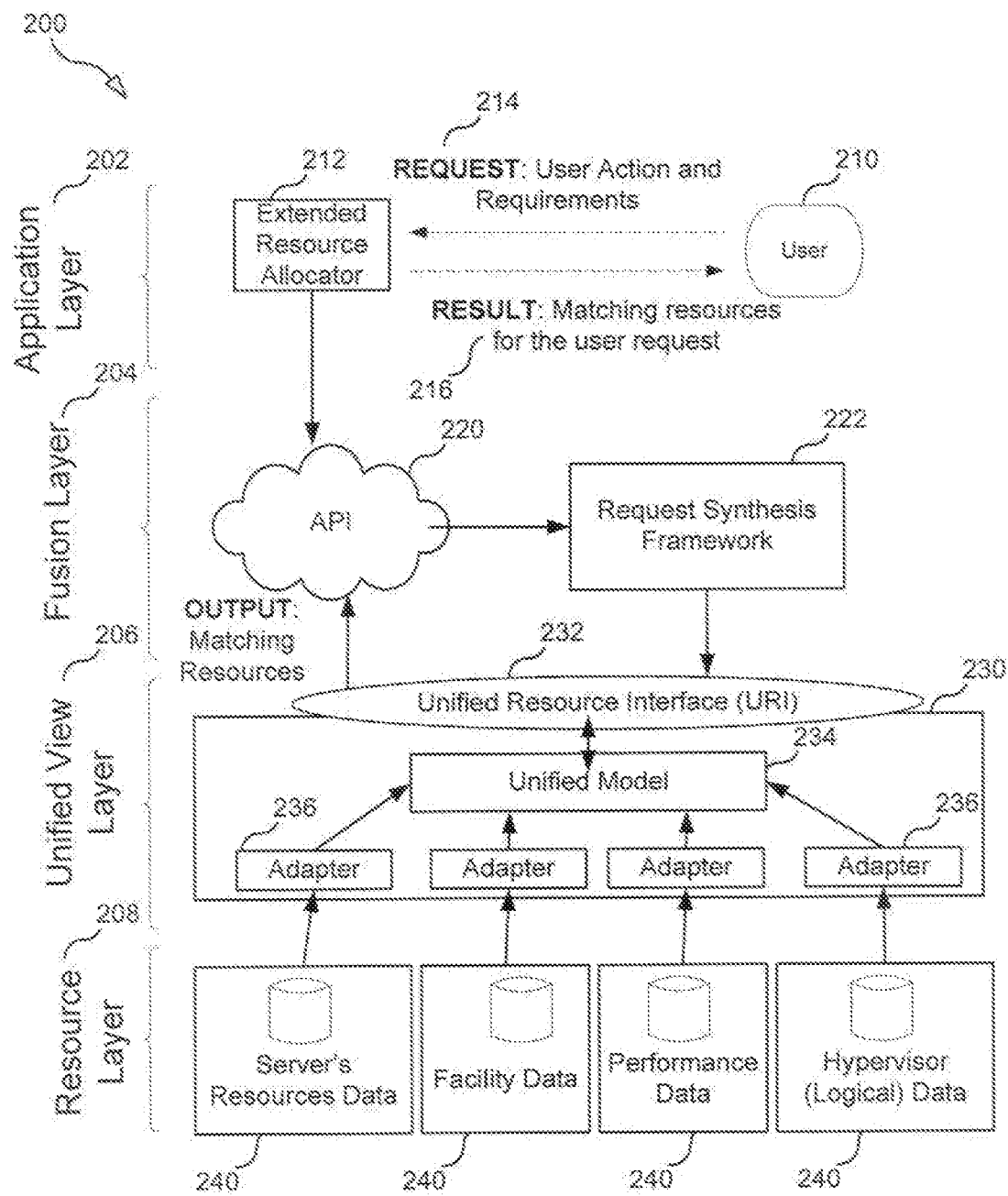
FIG. 2 illustrates a system according to a flow chart according to some embodiments.

FIG. 2 illustrates an exemplary system architecture according to some embodiments. System 200 includes a number of layers, including application layer 202, fusion layer 204, unified view layer 206, and resource layer 208.

Application layer 202 may interact with a user 210 and include an application. User 210 may access the application, which may include a command-line interface (CLI), a web interface, a GUI, and so on. An example of an application is AWS. Similar applications exist in the ITS domain. For example, an extended VM allocator in OpenStack or an extended Kubernates scheduler with container-based cloud services may be provided by the application layer 202. The user may access the application to request resources. For example, user 210 may issue a resource allocation request 214, which may include a user action and user requirements. After system 200 processes the request, user 210 may be presented with results 216, which may include resources that matched the request 214. Embodiments remove the need for frequent changes that are normally required in an application layer (e.g., CLI or API changes). Based on the structure of system 200, application layer 202 is resilient to the need for these changes. In embodiments, this may be achieved through one or more of the other layers provided in system 200. The application and/or interface that user 210 interacts with may itself be in communication with an extended resource allocator 212. Extended resource allocator 212 is in communication, either directly or indirectly (e.g., through an intermediary) with the fusion layer 204. Extended resource allocator 212 may include a scheduler.

While application layer 202 is the upper-most layer shown in FIG. 2, resource layer 208 is the lowest-most layer shown in FIG. 2. Similarly, while application layer 202 may be close to the user, resource layer 208 may be close to resources 240. Examples of resources 240 include a Nova database, a Facility database, and other databases, such as those that outline the inventory of physical and/or logical resources. In embodiments, the resources 240 managed by the resource layer 208 include resources that are offered by a data-center tenant. The resource layer 208 includes models (a.k.a. schema) for data. For example, the resource layer may include a database schema (e.g., in case of a relational database management system (RDBMS) database) and/or a Web Ontology Language (OWL) schema (e.g., in case of an ontology-based data source). The resources 240 in the resource layer 208 are in communication, either directly or indirectly (e.g., through an intermediary) with the unified view layer 206.

Unified view (a.k.a. model) layer 206 may include, for example, unified model 234 on top of some or all of the resources (e.g., data sources) and respective adapters 236 for some or all of the resources (e.g., data sources). For example, an adapter 236 for communicating with a database management system (DBMS) may include an adapter e.g., capable of the Open Database Connectivity (ODBC) protocol, or the Java Database Connectivity (JDBC) protocol. Unified view layer 206, in some embodiments, may include at least three parts: (1) the adapter part (including adapters 236), (2) the unified model part (including unified model 234); and (3) the unified interface part (including unified resource interface (URI) 232). Unified view layer 206 may act as a mediation layer between resources 240 (e.g., data sources) and the user 210 requesting those resources. Unified view layer 206 may integrate the respective resource model for a given resource into a unified model representation. This integration may, for example, be accomplished either through mapping, conversion, wrapping, or other techniques. Unified view layer subsystem 230 may include each of the adapter part, unified model part, and unified interface part. Subsystem 230 may comprise a single housing, or its functionality may be spread out across a number of systems and/or services. Unified view layer 206 is in communication, either directly or indirectly (e.g., through an intermediary) with the fusion layer 204.

In embodiments, the adapter part may include an adapter 236 for a given resource 240 (e.g., data source); the adapter 236 may parse data from the resource 240 and convert the data into a common representation (a.k.a. format), e.g., for use by unified model 234. For example, data from an RDMS database, a NoSQL database, and/or a Resource Description Framework (RDF) database, among others, may be converted to be used in the common, unified model 234.

In embodiments, the unified model part may provide a unified representation of the resources, e.g. through unified model 234. For example, the unified model part essentially brings together parameters and/or attributes of a given resource 240 (e.g., parameters/attributes that relate to a single compute or storage node in a data center) from various and potentially disparate resources (e.g., data sources) into single umbrella model (a.k.a. representation), irrespective of local naming conventions specific to the respective resources (e.g., which may be different or even inconsistent). For example, in case of RDBMS-based data sources, the unified model part may include an entity-relationship model. In case of RDF-based data sources, the unified model part may include an OWL-based model. The unified model part may include aspects of one or more different types of models. In embodiments, a mapping-based model may be used, which converts original data from a respective data sources into a target model. For example, a compute node identified in a Nova database and in a Ceilometer database may be the same. However, it may not be possible to infer this without additional specification. The unified model part (which serves as this additional specification) may, for example, use an entity-relationship model or a mapping model to bring together the compute node identified in both the Nova database and the Ceilometer database.

In embodiments, the unified interface part may include URI 232. URI 232 may be based on a target model (e.g., the unified model part), through which URI 232 exposes resources and/or data to higher layers (e.g., application layer 202, fusion layer 204). For example, URI 232 could be based on SPARQL (e.g., if the unified model part includes an RDF or Semantic component) and/or SQL (e.g., if the unified model part includes an RDBMS component). Alternate program formats are also possible. URI 232 essentially integrates a data model or a query model for various data sources located at lower layers.

Fusion layer 204, in embodiments, may take at least two types of inputs, including a request for resources (e.g., from a user and/or application), and operator/tenant policies (e.g., from an operator of the resources). Such input may come from, for example, application layer 202, via API 220, and may be fed into the request synthesis framework (RSF) 222. Fusion layer 204 may derive a user request fragment (URF) from the resource allocation request 214 (e.g., a user request). Fusion layer 204 may derive a policy definition fragment (PDF) from the operator/tenant policies, e.g. from a policy store. Fusion layer 204 may produce an output in the form of a query or program that is executable over the unified interface part of the unified view layer 206. This query or program may be aligned with the unified model part, for example, which makes it feasible to generate such a query/program, which is referred to herein as a single generated unified query representation.

Figure 3:
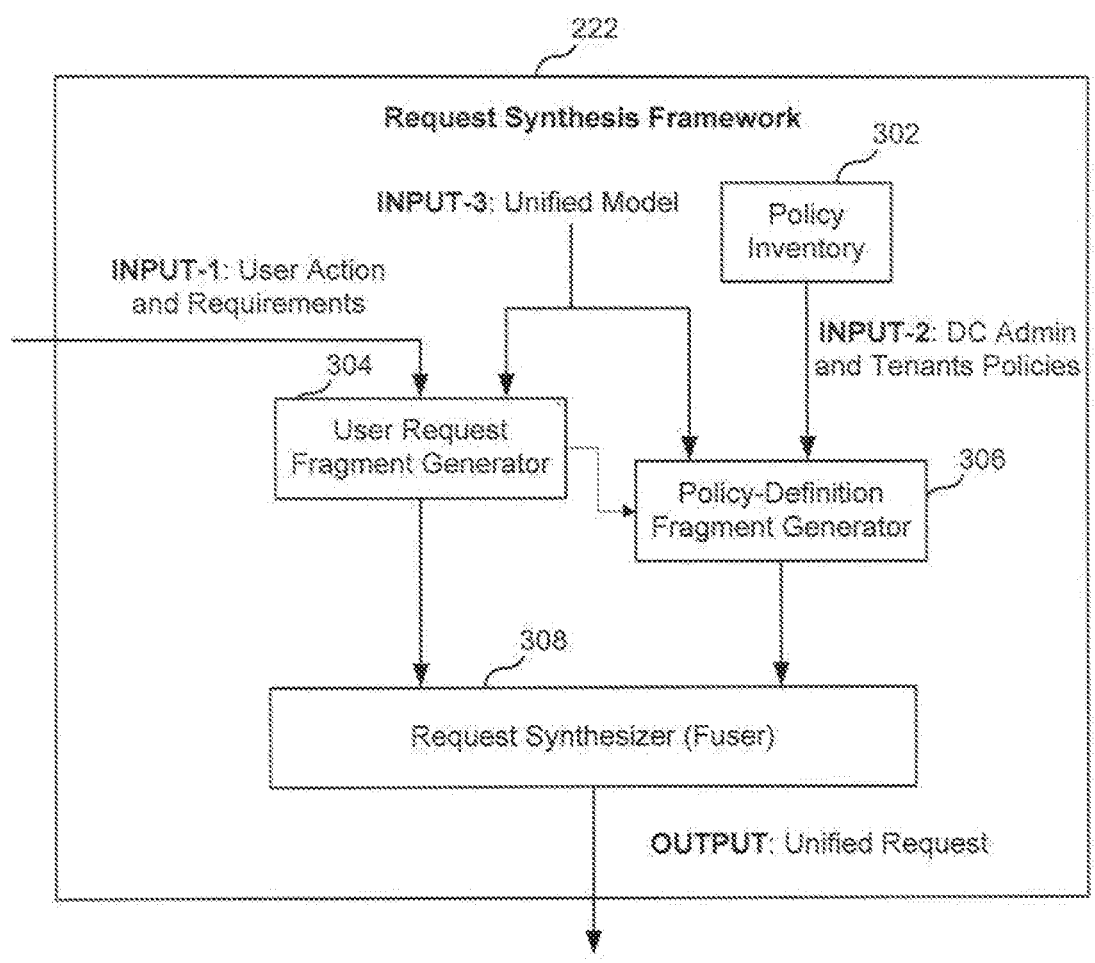

FIG. 3 illustrates the RSF 222, according to exemplary embodiments. RSF 222 may include a policy inventory 302, a user request fragment generator (URFG) 304, a policy definition fragment generator (PDFG) 306, and a request synthesizer (a.k.a. fuser) 308. The URFG 304 may take as input the user action and requirements from the request 214 (e.g., request 214 may itself be an input, or some processing may have occurred on request 214 resulting in determining a user action and requirements from the request 214). The URFG 304 may also take as input the unified model 234. The PDFG 306 may take as input one or more policies, e.g., from policy store 302. Such input policies may in some embodiments be dependent upon request 214, e.g., the user action specified in request 214. The PDFG 306 may also take as input the unified model 234. The outputs of URFG 304 and PDFG 306 feed into fuser 308. Fuser 308 results in a unified request as its output.

Figure 4:
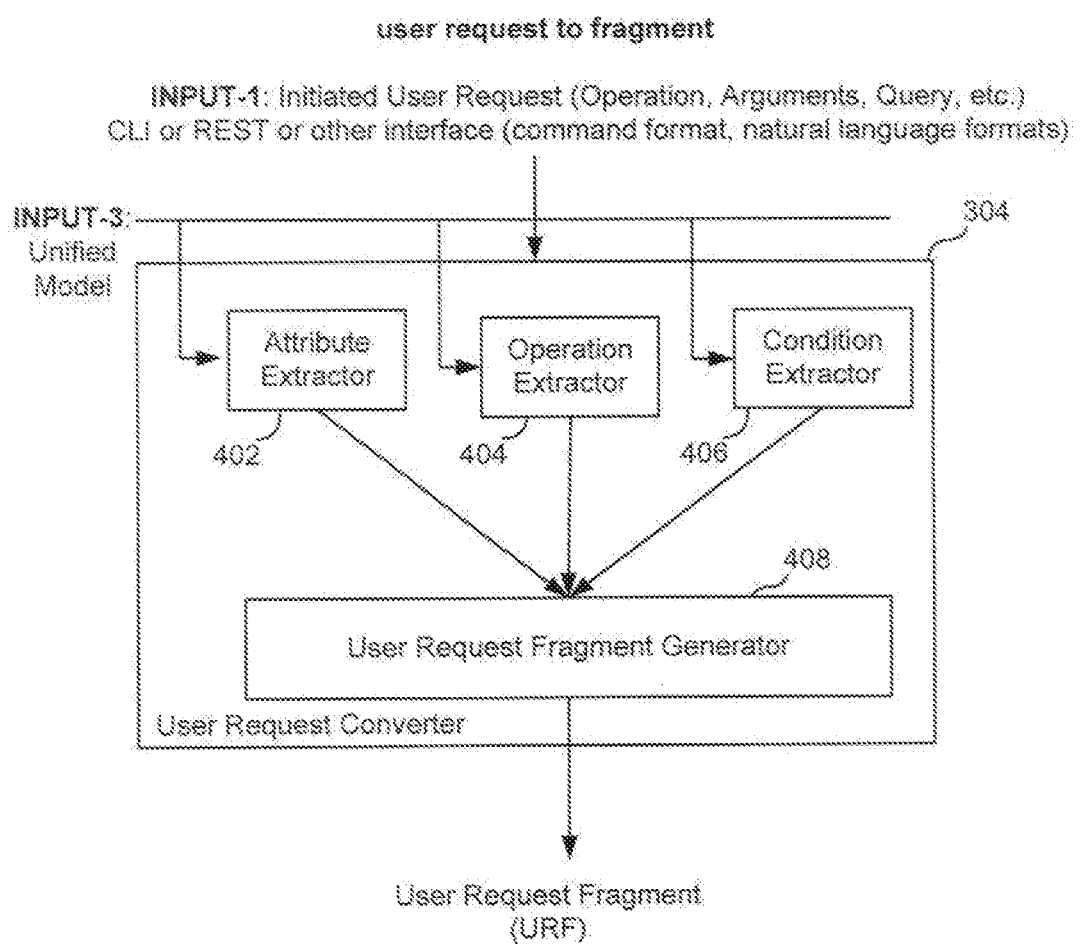
FIG. 4 illustrates a system according to some embodiments.

FIG. 4 illustrates URFG 304, according to exemplary embodiments. URFG 304 (a.k.a. user request converter) may include one or more extractors, such as attribute extractor 402, operation extractor 404, and condition extractor 406, and a user request fragment generator 408. Each of the extractors may take as input the user action and requirements from the request 214. Each of the extractors may also take as input the unified model 234. The extractors (e.g., extractors 402, 404, 406) may make use of natural language processing to process inputs. The user request fragment generator 408, as part of the URFG 304, may take as input the output of the extractors, and produce a URF as output. The user request fragment generator 408 may also take as input the user action and requirements from the request 214.

In embodiments, URFG 304 may determine user requirements from request 214. These requirements may be specified, for example, through a respective application interface (application-specific notation may be followed here). For example, a CLI may include a command that has a query option (e.g., "--query") from which user requirements may be extracted. These user requirements may then be transformed, e.g. via user request fragment generator 408, into a URF that e.g., adheres to SPARQL or an equivalent language. Generating the URF may be done in different ways, and may, for example, depend on the number of interfaces provided to the user. Similarly, user requirements may be extracted from inputs in the form of templates, such as Topology and Orchestration Specification for Cloud Applications (TOSCA) templates or Heat templates (as well as extended variants of these). These user requirements may be passed through a set of extractors 402, 404, 406 which apply specific extractions (e.g., based on command, domain, and/ or input structure) to provide URF components such as attributes, operations (e.g., logical AND, logical OR), conditions (e.g., filters such as "computeNode.cpuType==Xeon"). These URF components may then be synthesized by the URFG, which generates the URF. In embodiments, the URF may be a composition of all of the extracted URF components. The URF may be passed on to the next phase of policy fusing, e.g. to be used by the PDFG 306.

Figure 5:
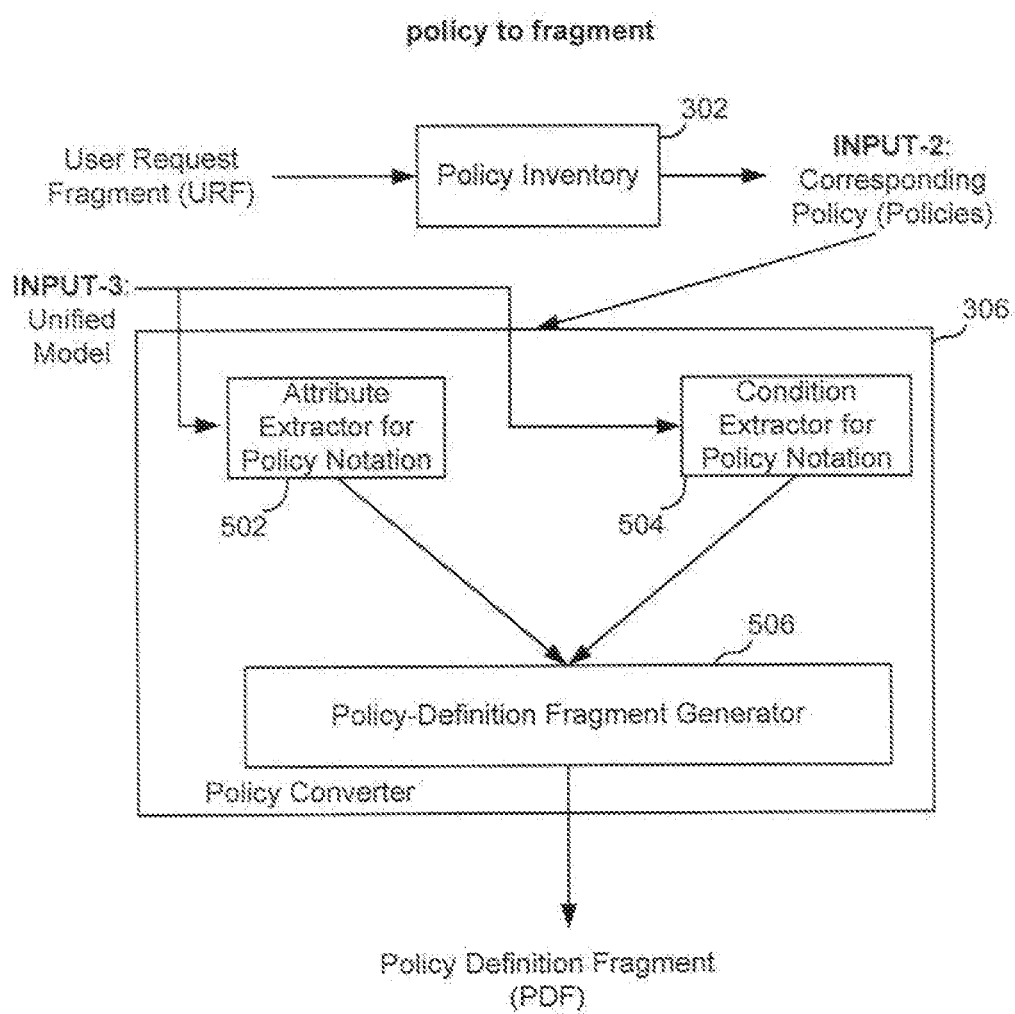
FIG. 5. illustrates a system according to some embodiments according to some embodiments.

FIG. 5 illustrates PDFG 306, according to exemplary embodiments. PDFG 306 (a.k.a. policy converter) may include one or more extractors, such as attribute extractor 502 and condition extractor 504, and policy definition fragment generator 506. Each of the extractors may take as input one or more corresponding policies, e.g., policies corresponding to request 214. For example, the URF generated by URFG 304 may be passed to policy inventory 302, from which the one or more policies may be obtained. Operators' and/or tenants' policies may be retrieved from policy inventory 302, e.g. based on the current request for resources, including the user action and/or operation (e.g., such as VM-create). In embodiments, policies that match the current user action may be retrieved from the policy inventory. Each of the extractors may also take as input the unified model 234. The policy definition fragment generator 506, as part of the PDFG 306, may take as input the output of the extractors, and produce a PDF as output. The policy definition fragment generator 506 may also take as input the corresponding policies.

The policy or policies retrieved from the PI may include a policy definition (PD) that follows a specific language or notation. The extractors used by the PDFG have knowledge of the PD format, including any specific language or notation. In embodiments, the PD is passed through a set of extractors (e.g., an attribute extractor 502, a condition extractor 504) which applies specific extractions (e.g., based on command, domain, and/or input structure) to retrieve PDF components such as attributes and conditions (e.g., filters such as "floor==4"). The PDF components may be mapped to the attribute names found in the unified model part. The PDFG synthesizes the PDF artifact, which in embodiments may be a composition of all the extracted PDF components. The PDF may be passed on to the next phase of fusing, e.g. to be used by fuser 308.

Figure 6:
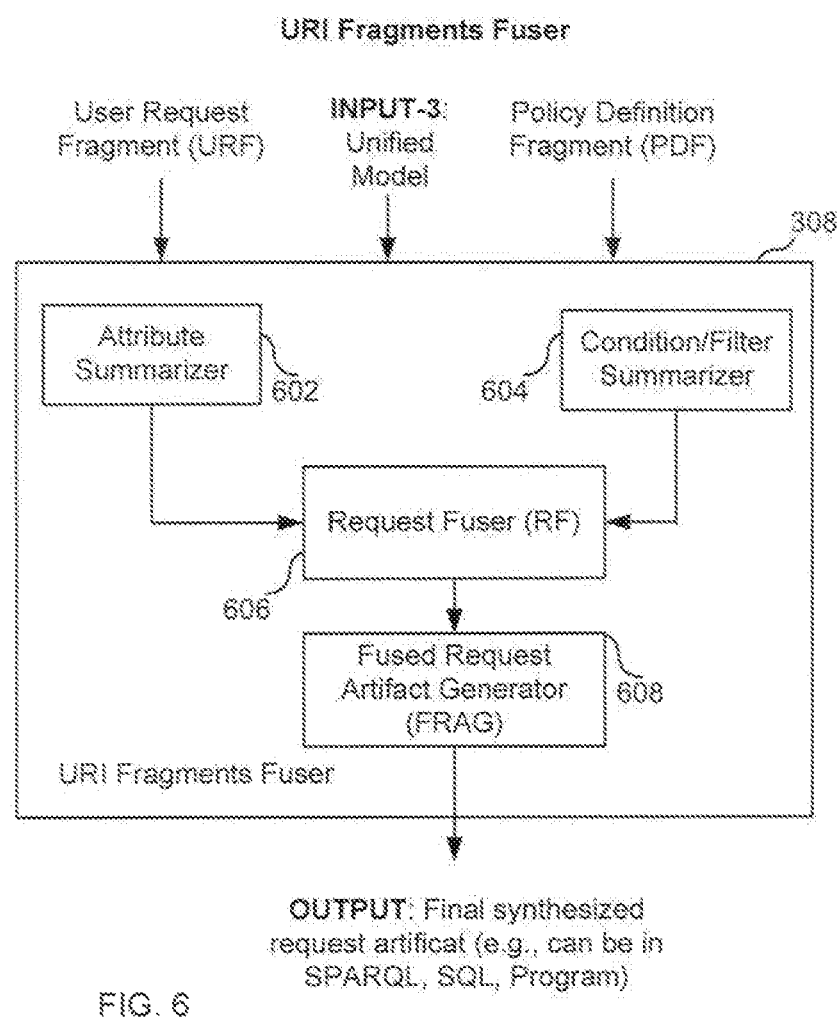
FIG. 6 illustrates a system according to some embodiments.

FIG. 6 illustrates fuser 308, according to exemplary embodiments. Fuser 308 (a.k.a. URI fragments fuser) may include attribute summarizer 602, condition/filter summarizer 604, request fuser (RF) 606, and fused request artifact generator (FRAG) 608. The URF, PDF, and unified model 234 may be inputs into fuser 308. For example, attributes summarizer 602 and condition/filter summarizer may take the URF, PDF, and unified model 234 as input, and feed their output into RF 606. RF 606, in embodiments, may handle a situation where common attributes between the URF and PDF may have different names. In that situation, the unified model 234 may be used to normalize similar attributes identified by the different names RF 606 may then feed into FRAG 608, and FRAG 608 produces as output the final synthesized request artifact (e.g., in SPARQL, SQL, a descriptive specification which may be interpreted by a program, or an executable program). In embodiments, the final synthesized request artifact may be executable over the unified interface.

Figure 7:
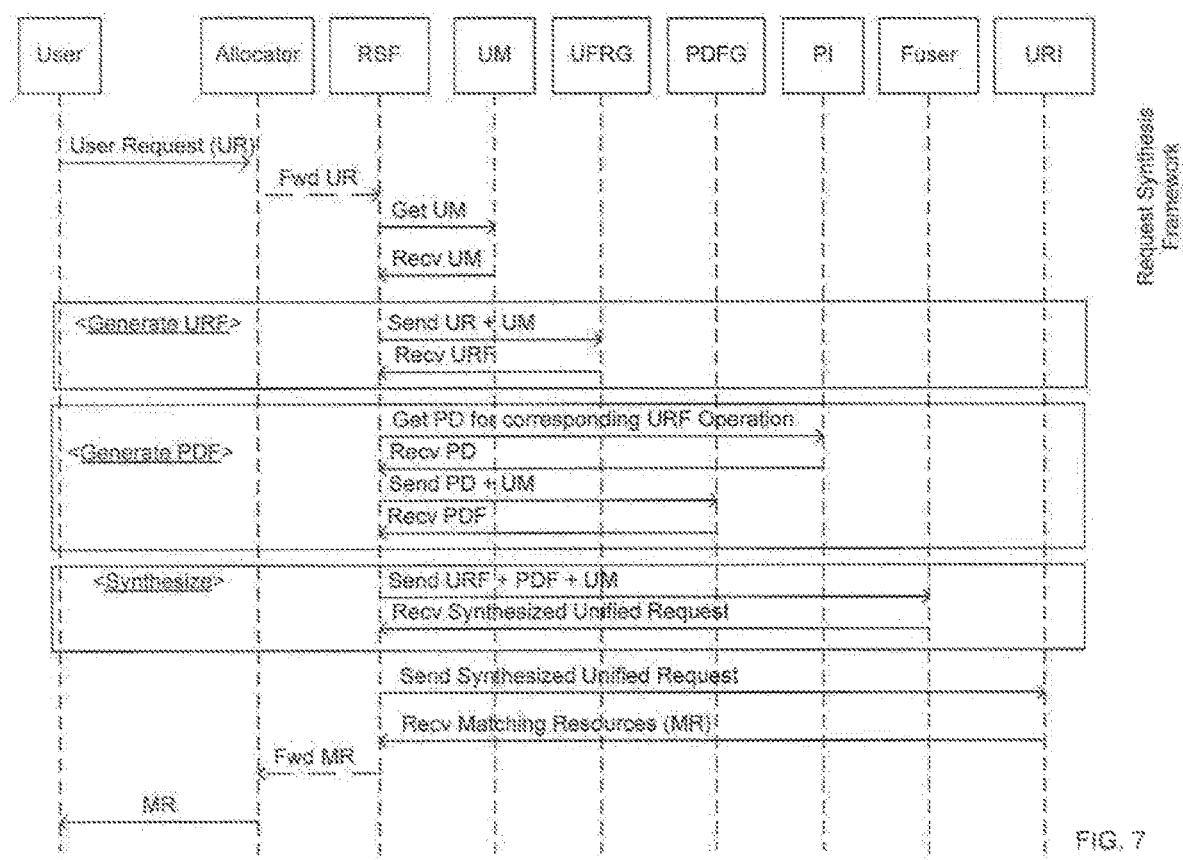
FIG. 7 is a sequence diagram according to some embodiments.

While FIGS. 3-6 illustrate schematic representations of request synthesis framework 222, FIGS. 7-10 illustrate sequence diagrams for system 200. FIG. 7 illustrates an end-to-end sequence flow, according to exemplary embodiments. FIG. 7 shows a sequence flow among the following components: User 210, allocator 212, RSF 222, unified model (UM) 234, URFG 304, PDFG 306, policy inventory (PI) 302, Fuser 308, and URI 232. User 212 issues a user request (UR), which is passed to allocator 212. Allocator 212 may forward this request to RSF 222. RSF 22 may then request (and receive) the unified model from unified model 234. Following this are three subsequences, including generating the URF (shown in further detail in FIG. 8), generating the PDF (shown in further detail in FIG. 8), and synthesizing the final request (shown in further detail in FIG. 10). As shown in FIG. 7, generating the URF includes RSF 222 sending the UR and UM to the UFRG 304, and then receiving the URF from URFG 304. Generating the PDF includes RSF 222 requesting (and receiving) policy definitions (e.g., corresponding to the URF) from PI 302. Generating the PDF also includes RSF 222 sending the policy definitions and UM to PDFG 306 and receiving the PDF from PDFG 306. Synthesizing the final request includes RSF 222 sending the URF, PDF, and UM to fuser 308, and receiving the synthesized unified request from fuser 308. Once the synthesized unified request is received, RSF 222 may send it to the URI 232, and then receive from the URI 232 the available resources matching the request (matching resources or MR). RSF 222 may forward the MR to allocator 212, and allocator 212 may then pass the MR to user 210.

Figure 8:
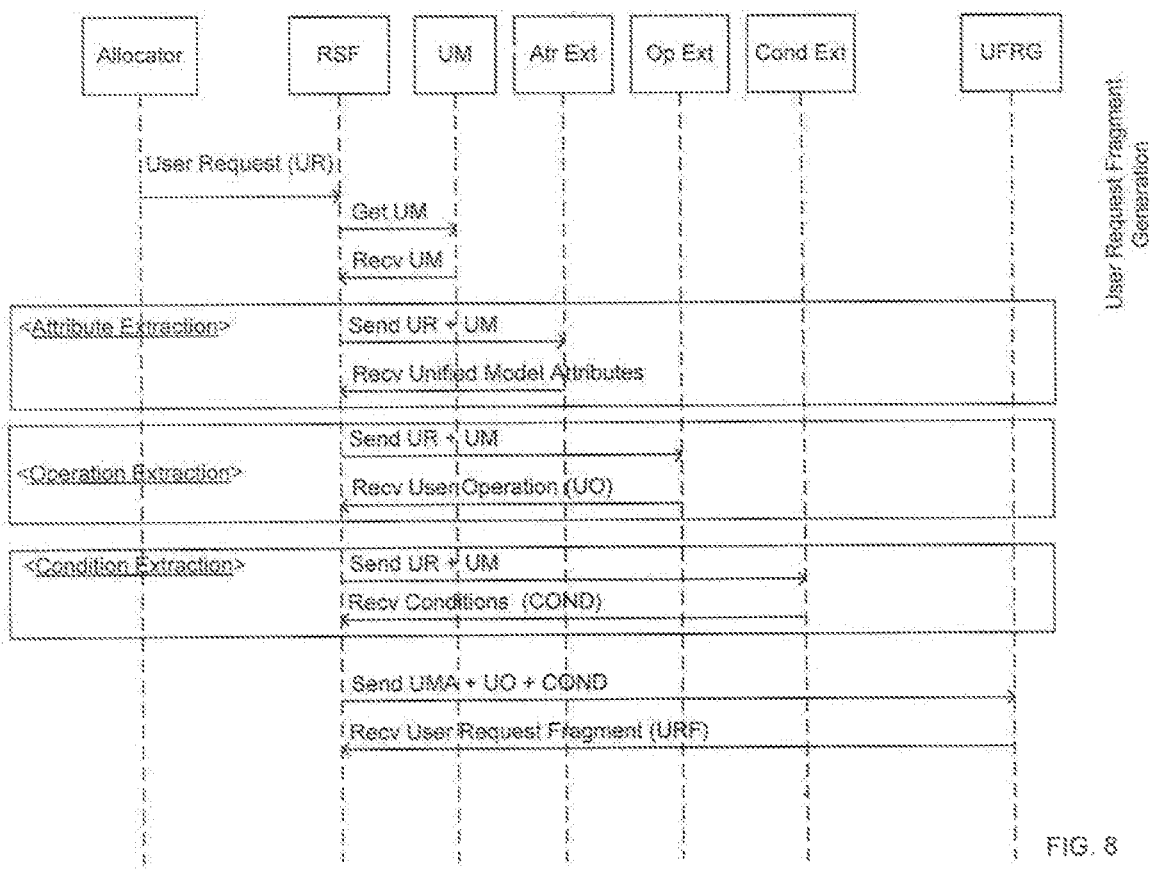
FIG. 8 is a sequence diagram according to some embodiments.

FIG. 8 illustrates a sequence flow for URFG 304, according to exemplary embodiments. FIG. 8 shows a sequence flow among the following components: allocator 212, RSF 222, UM 234, attribute extractor 402, operation extractor 404, condition extractor 406, and URFG 304. As shown in FIG. 7, allocator 212 may pass the UR to RSF 222, and RSF 222 may then request and receive the UM. Following this are three subsequences, including attribute extraction, operation extraction, and condition extraction. Attribute extraction includes RSF 222 sending the UR and UM to attribute extractor 402, and RSF 222 receiving from attribute extractor 402 the unified model attributes (UMA). Operation extraction includes RSF 222 sending the UR and UM to operation extractor 404, and RSF 222 receiving from operation extractor 404 the user operation (UO). Condition extraction includes RSF 222 sending the UR and UM to condition extractor 406, and RSF 222 receiving from condition extractor 406 the conditions (COND). Following this, RSF 222 may send the UMA, UO, and COND to UFRG 304, and RSF 22 may then receive from UFRG 304 the generated URF.

Figure 9:
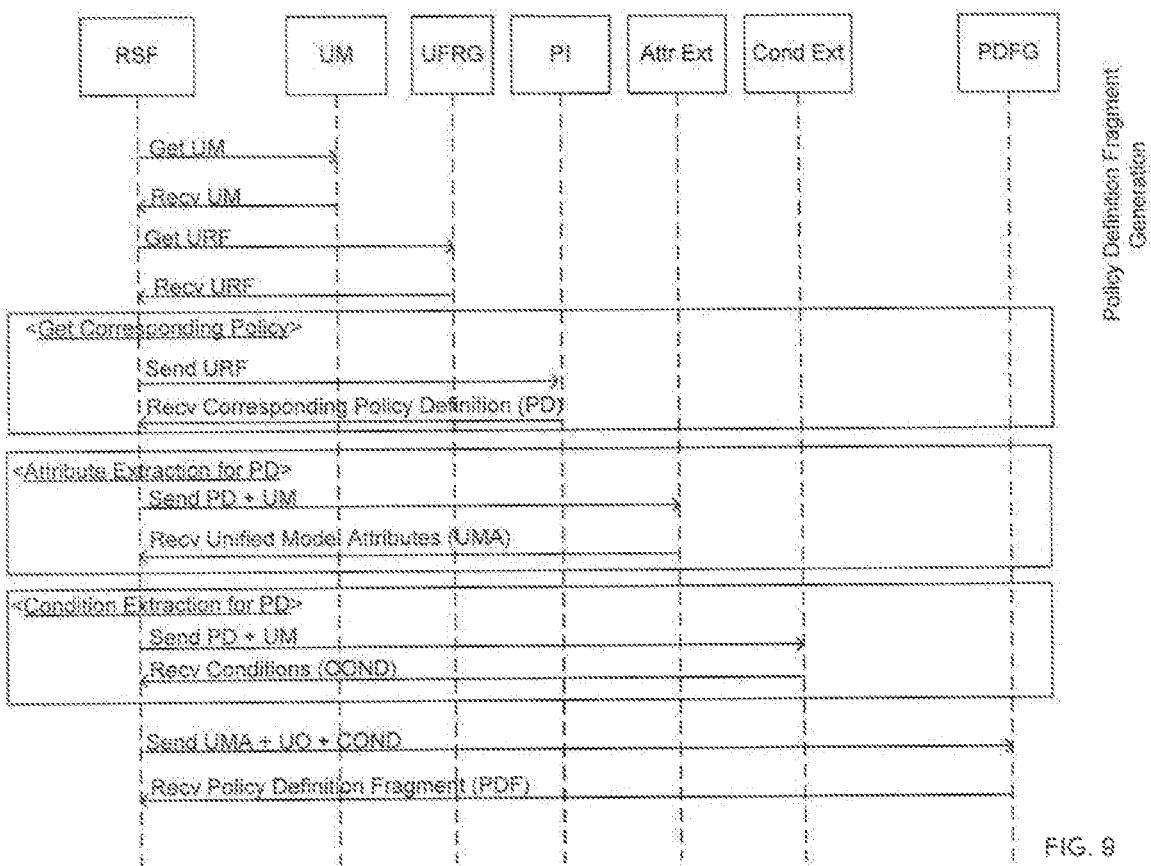
FIG. 9 is a sequence diagram according to some embodiments.

FIG. 9 illustrates a sequence flow for PDFG 306, according to exemplary embodiments. FIG. 9 shows a sequence flow among the following components: RSF 222, UM 234, URFG 304, PI 302, attribute extractor 502, condition extractor 504, and PDFG 306. As shown in FIG. 7, RSF 222 may request (and receive) the UM from UM 234. RSF 222 may request (and receive) the URF from UFRG 304 (e.g., as shown in FIGS. 7 and 8). Following this are three subsequences, getting the corresponding policy or policies for the URF, attribute extraction for policy definition, and condition extraction for policy definition. Getting the corresponding policy or policies for the URF includes RSF 222 sending the URF to PI 302, and RSF 222 receiving from PI 302 the corresponding policy definition(s) (PD(s)). Attribute extraction for policy definition includes RSF 222 sending the PD(s) and UM to attribute extractor 502, and RSF 222 receiving from attribute extractor 502 unified model attributes (UMA). Condition extraction for policy definition includes RSF 222 sending the PD(s) and UM to condition extractor 504, and RSF 222 receiving from condition extractor 504 conditions (COND). RSF 222 may then send UMA and COND to PDFG 306, and RSF 222 may then receive from PDFG 306 the generated PDF.

Figure 10:
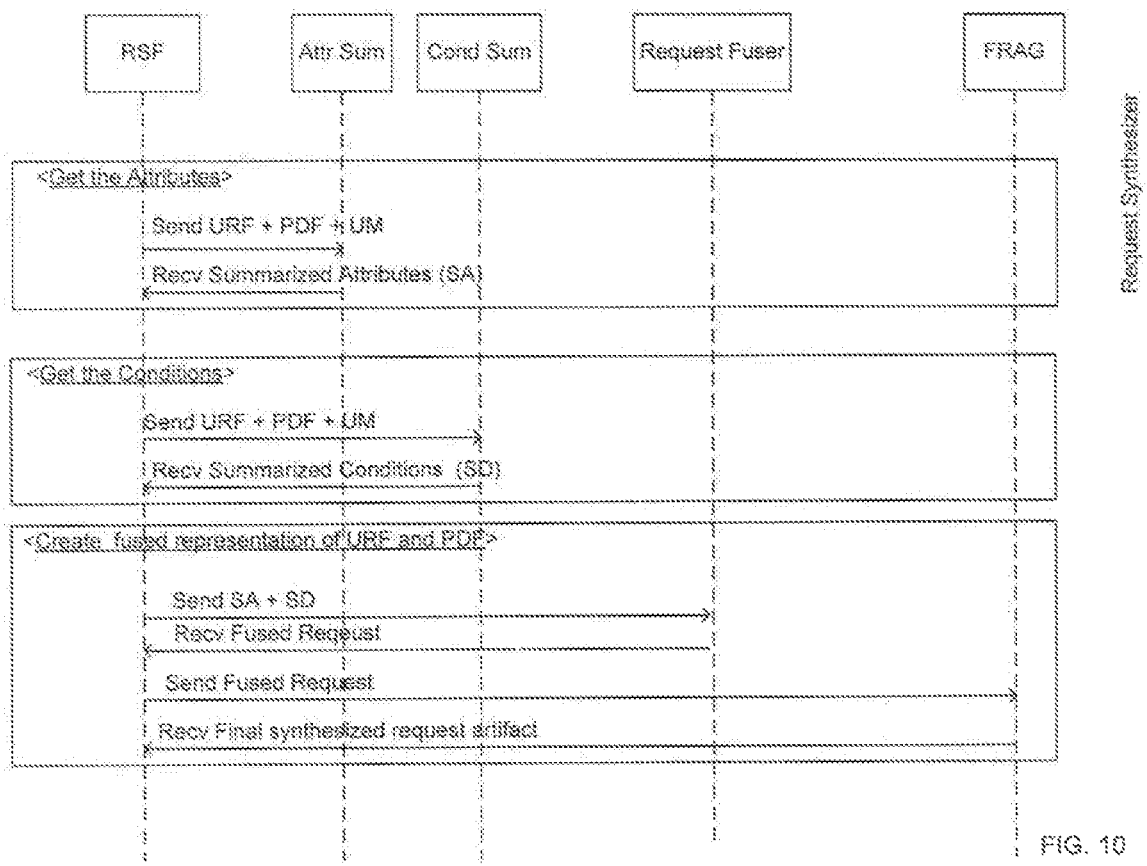
FIG. 10 is a sequence diagram according to some embodiments.

FIG. 10 illustrates a sequence flow for FRAG 608, according to exemplary embodiments. FIG. 10 shows a sequence flow among the following components: RSF 222, attribute summarizer 602, condition summarizer 604, request fuser 606, and FRAG 308. FIG. 10 shows three subsequences, including getting the attributes, getting the conditions, and creating a fused representation of the URF and PDF. Getting the attributes includes RSF 222 sending the URF, PDF, and UM attribute summarizer 602, and RSF 222 receiving from the attribute summarizer 602 the summarized attributes (SA). Getting the conditions includes RSF 222 sending the URF, PDF, and UM to the condition summarizer 604, and RSF 222 receiving from the condition summarizer 604 the summarized conditions (SD). Creating a fused representation of the URF and PDF includes RSF 222 sending the SA and SD to request fuser 606 and RSF 222 receiving from request fuser 606 the fused request (e.g., as an internal representation). Creating the fused representation of the URF and PDF may also include RSF 222 sending the fused request to FRAG 308, and RSF 222 receiving from FRAG 308 the final synthesized request artifact.

The fusion layer 204, in embodiments, avoids the need for an imperative style of filters (e.g. as in the OpenStack Nova filters previously discussed) and may also enable end-user applications (e.g., CLI or RESTful interfaces) to seamlessly query based on newly exposed properties.

Existing systems and practices, especially among cloud operators, are limited to static tagging methods, and do not allow requesting resources by their non-exposed properties (i.e., existing imperative systems must expose certain properties for applications to make use of, such as through additional implementations specific to those properties). This is a highly limiting factor when the all possible resource properties are not exposed. A key problem with existing IaaS systems (such as AWS, Azure, OpenStack, and Kubernates), is that they do not allow users to query for resources based on non-exposed capabilities. Specialized applications like NFVs (e.g., used in the telecom sector) and/or machine-learning workloads exhibit a need for special resources like Data Plane Development Kit (DPDK) capable NICs and GPUs. These sorts of properties represent evolving capabilities, and such evolving capabilities need explicit coding and/or tagging to be exposed by traditional methods. Such resource properties are not exposed in conventional systems.

Embodiments provide for dynamically identifying the resources in the data center by their properties. Properties here may represent host capabilities, facility, and similar other administrative identifiers.

For example, the existing resource allocation API or CLI can be extended with a "--query" option where users can specify additional resource requirements. The extended OpenStack/Kubernates scheduler has additional access to Facility and Performance data. Embodiments allow the CLI/API "--query" option to specify any possible resource by its properties when requesting resources. In embodiments, the extended scheduler which has access to such additional data enables the fusion framework to work with all the resource properties seamlessly.

An exemplary application of some embodiments related to VM-based IaaS is provided. Different stakeholders may wish to enforce various requirements and/or constraints. A data center administrator, for example, may wish to enforce geographical policies (e.g., can use any machine not on fourth floor), power-related policies (e.g., can use any machine not powered by a given power source), cooling-zone policies (e.g., can use any machine not on the west cool zone), and/or administrative policies (e.g., can use any machine with manufacturing date not older than 2010). A tenant administrator, for example, may wish to make sure that the tenant's application and/or VM is not run on machines made by a certain manufacturer, and/or that they are collocated with other tenants' VMs on the same hypervisor. A user or application level requirement, for example, could be to use two Intel Ironlake GPUs having at least 32 GB RAM; or one SR-IOV NIC that is not Mellanox; or a 1

TB 10K RPM SATA HDD or a 150 IOPS SSD; or to place a VM in a host with CPU utilization not greater than 60%.

For example, in a cloud-based domain, a user resource allocation request may look something like: "create-vm <bunch of options> -query "compute.gpuType=IronLake"." In this example, there may be a tenant policy that looks like compute.CPUutilPercent <=60 as well as an operator policy that looks like computeNode.floor !=4.

A fusion step for this example may, in some embodiments, be enabled through a VM scheduler/allocator (e.g., allocator 212), which may be a replaced or extended version of VM scheduler/allocator in IaaS systems such as OpenStack, and where the replaced or extended version enables integration with other dat-sources such as facility and performance sources. The allocator 212, instead of interacting for example with Nova, forwards the user request to RSF 222, which synthesizes a request that has fused the requirements and policies. Based on the example above, the request to be synthesized may be something like RETRIEVE CANDIDATE COMPUTENODES where compute.gpuType= IronLake (host with certain gpuType) and compute.CPUutilPercent <=60 (usage<=60%) and computeNode.floor !=4 (and compute node not placed in floor no 4). The final synthesized request by fuser 308 may be in a SPARQL format over unified data. For example, the synthesized request shown below in Table is in SPARQL, where "DC" refers to datacenter resources, "FC" refers to facility properties, and "Perf" refers to usage and performance properties:

TABLE 1

```
SELECT ?computeNode
WHERE
{
    ?computeNode DC:resourceType "ComputeNode" .
    ?computeNode DC:gputType "IronLake"          .
    ?computeNode FC:floorNo ?floorNo             .
    ?computeNode Perf:CPUutilPercent ?CPUutil .
    FILTER {?floorNo != 4 && ?CPUUtil <= 60}
}
```

In the above example query, the user requirement and policy definitions are fused together into a single request (here a SPARQL query). This query (a.k.a. request) may then be passed back to the URI 232, and allocator 212 may retrieve available results. As can be seen, this seamlessly enables policy enforcement without imperative coding. Traditionally, this type of request processing would have to be done in multiple stages, e.g. where candidate resources will be identified based on type, then filtered for each requirement independently in multiple stages, e.g., matching for GPUType (resource inventory data), matching for floorNo (facility data), matching for CPUUtil (Ceilometer/performance data), and then verifying the conditions in respective stages. This requires filters for resource type or type of property that will be configured in sequence, and is not a scalable and extendable approach.

An exemplary application of some embodiments related to container-based IaaS is provided. Embodiments are also applicable to data centers that operate with container-based applications. For example, in Kubernates (container orchestrator), the data sources will be Kubelet (Node Information Database), CAdvisor, or Heapster (Performance Database) etc.

To schedule a container's Pod on Node (Minion) with disk type SSD, a user request may look something like: "kubectl run POD1 --image=my-image --port=8080 --<other bunch of options> --query "diskType=SSD"." In this example, there may be a tenant policy that looks like cluster.node. type="Production" and an operator policy that looks like node.podsDeployed<=6.

A fusion step for this example may, in some embodiments, be enabled through a container scheduler/allocator (e.g., allocator 212), which may be a replaced or extended version of a Kubernates container scheduler/allocator, where the replaced or extended version enables integration with other data sources such as facility and performance sources. The final synthesized request, in this example, as issued e.g. by fuser 308 in SPARQL format over unified data may look as shown below in Table 2 (where k8s refers to Kubernates resource properties):

TABLE 2

```
SELECT ?minionNode
WHERE
{
    ? minionNode DC:resourceType "ComputeNode"        .
    ? minionNode k8s:noOfPodsDeployed
            ?noOfPodsDeployed          .
    ? minionNode k8s:clusterType ?clusterType         .
    ? minionNode k8s:diskType ?diskType               .
    FILTER {?noOfPodsDeployed < 6  &&
        ?clusterType == "Production" &&
        ?diskType == "SSD"}
}
```

An exemplary application of some embodiments related to the ITS domain is provided. Embodiments are applicable to resource allocation problems in the ITS domain. For example, embodiments may enable the selection of a suitable bus that needs to be assigned to a route with certain constraints and policies. In this application, resources 240 may include bus inventory, route information systems, and/ or transport management information systems (e.g., capable of tracking bus's actual route and comparing to planned route). At the application layer 202, transport management information systems (e.g., which deal with bus allocation for various routes), may be used.

As an example, a bus operator may request an idle bus (a resource) to be allocated for route number 10 with a capacity of no more than 40 seats. In this example, a policy constraint may include that bus.model !=ABC & route.length>=15 (e.g., operator does not want to use ABC model bus when the route length is >15 km). The final synthesized request, e.g. by the fuser 308, may look as shown in Table 3 below:

TABLE 3

```
SELECT ?bus
WHERE
{
    ?bus BusInventory:resourceType "PassengerBus" .
    ?bus BusInventory:currentServiceState
            "InService" .
    ?bus BusInventory:busModel ?busModel         .
    ?bus BusInventory:busSeating ?busSeating     .
    FILTER {?busSeating <= 40)
    FILTER {?routeLengh >= 15 && ?busModel != "ABC")
    {
        SELECT max(?routeLength)
        WHERE
        {
            ?route Route:resourceType 'Route'.
            ?route Route:routeNo '10' .
            ?route Route:routeLength ?routeLength
        }
    }
}
```

Figure 11:
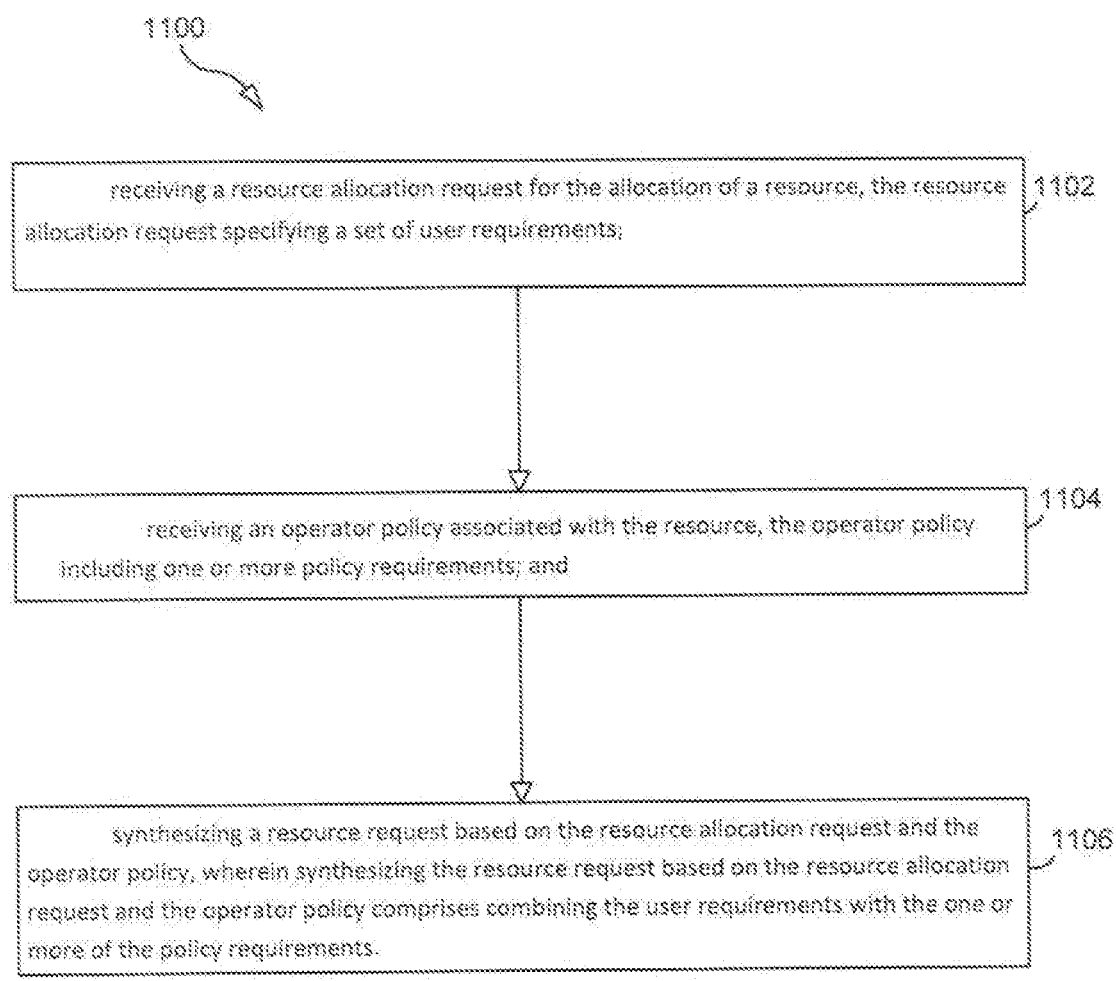
FIG. 11 illustrates a process according to some embodiments.

FIG. 11 illustrates a process according to exemplary embodiments. Process 1100 includes receiving a resource allocation request for the allocation of a resource, the resource allocation request specifying a set of user requirements (step 1102). Process 1100 further includes receiving an operator policy associated with the resource, the operator policy including one or more policy requirements (step 1104). Process 1100 further includes synthesizing a resource request based on the resource allocation request and the operator policy (step 1106). Synthesizing the resource request based on the resource allocation request and the operator policy comprises combining the user requirements with the one or more of the policy requirements.

In some embodiments, process 1100 further includes issuing the synthesized resource request to obtain resource identifiers identifying resource instances that satisfy the synthesized resource request; receiving the resource identifiers; and allocating one of the resource instances in response to the resource allocation request. In embodiments, issuing the synthesized resource request to obtain resource identifiers comprises processing the synthesized resource request into a resource query and executing the resource query. In some embodiments, issuing the synthesized resource request to obtain resource identifiers comprises directly executing the synthesized resource request.

In embodiments, the synthesized resource request to obtain resource identifiers comprises a computer program. In embodiments, synthesizing the resource request based on the resource allocation request and the operator policy comprises generating a user-request fragment. Generating the user-request fragment comprises extracting the user requirements from the resource allocation request and composing the extracted user requirements. In some embodiments, the user requirements comprise one or more of attributes, operations, and conditions related to the requested resource. In some embodiments, synthesizing the resource request based on the resource allocation request and the operator policy comprises generating a policy-definition fragment. Generating the policy-definition fragment comprises extracting the policy requirements from the operator policy and composing the extracted policy requirements. In embodiments, the policy requirements depend at least in part on the resource allocation request, and the policy requirements may comprise one or more of attributes and conditions related to the requested resource.

In some embodiments, the synthesized resource request is based on one or more of the user-request fragment and the policy-definition fragment. In embodiments, process 1100 further includes generating a unified model representing a plurality of resources, the unified model comprising one or more adapters acting as intermediaries to one or more data sources. In embodiments, the resource comprises one or more resource components within a data center, the one or more resource components including virtual machines. In embodiments, the resource comprises one or more resource components within an intelligent transport system, the one or more resource components including buses.

Figure 12:
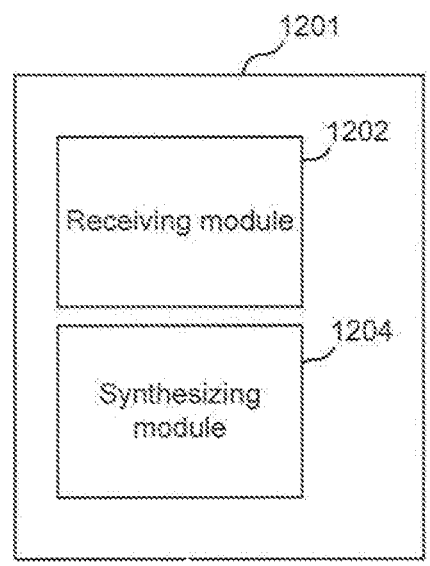
FIG. 12 is a diagram showing functional modules of a device according to some embodiments.

FIG. 12 is a diagram showing functional modules of device 1201 (e.g., a server, computer, etc.) according to some embodiments. As shown in FIG. 12, device 1201 includes a receiving module 1202 and a synthesizing module 1204. Receiving module 1202 is configured to receive a resource allocation request for the allocation of a resource, the resource allocation request specifying a set of user requirements. Receiving module 1202 is further configured to receive an operator policy associated with the resource, the operator policy including one or more policy requirements. Synthesizing module 1204 is configured to synthesize a resource request based on the resource allocation request and the operator policy. Synthesizing the resource request based on the resource allocation request and the operator policy comprises combining the user requirements with the one or more of the policy requirements.

Figure 13:
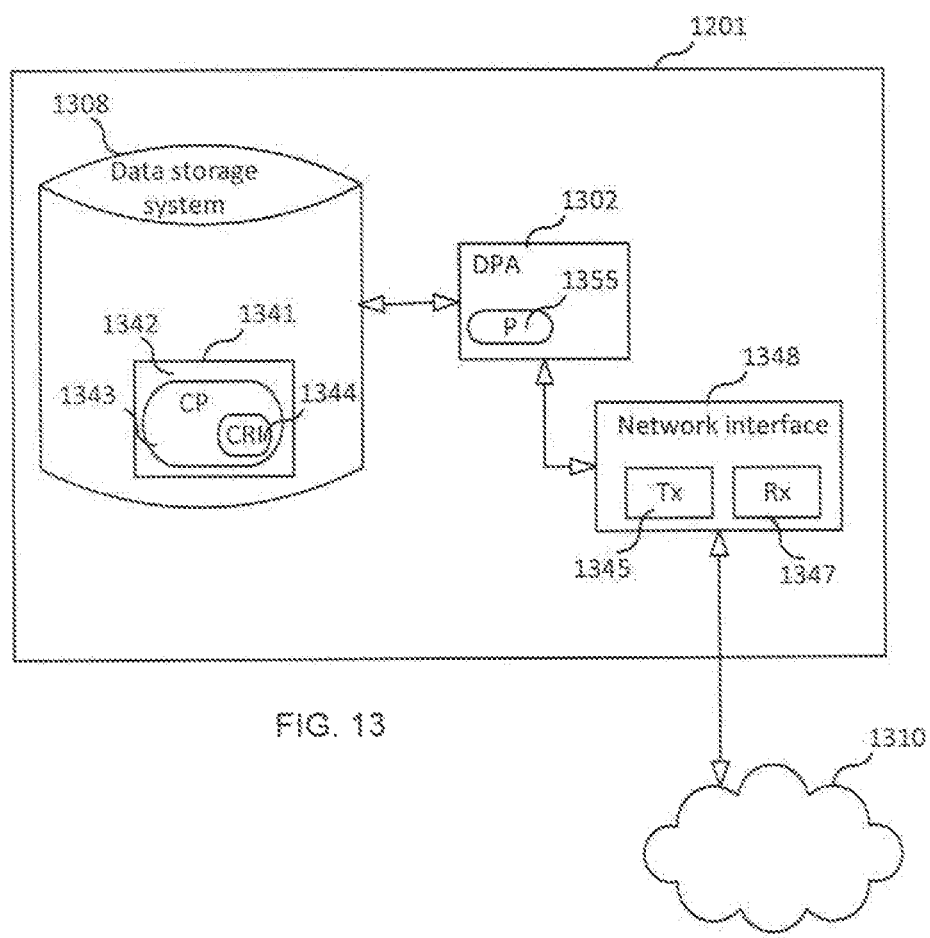
FIG. 13 is a block diagram of a device according to some embodiments.

FIG. 13 is a block diagram of device 1201 according to some embodiments. As shown in FIG. 13, device 1201 may comprise: a data processing apparatus (DPA) 1302, which may include one or more processors (P) 1355 (e.g., a general purpose microprocessor and/or one or more other processors, such as an application specific integrated circuit (ASIC), field-programmable gate arrays (FPGAs), and the like); a network interface 1348 comprising a transmitter (Tx) 1345 and a receiver (Rx) 1347 for enabling device 1201 to transmit data to and receive data from other nodes connected to a network 1310 (e.g., an Internet Protocol (IP) network) to which network interface 1348 is connected; and local storage unit (a.k.a., "data storage system") 1308, which may include one or more non-volatile storage devices and/or one or more volatile storage devices (e.g., random access memory (RAM)). In embodiments where device 1201 includes a general purpose microprocessor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, but not limited to, magnetic media (e.g., a hard disk), optical media, memory devices (e.g., random access memory), and the like. In some embodiments, the CRI 1344 of computer program 1343 is configured such that when executed by data processing apparatus 1302, the CRI causes device 102 to perform steps described above (e.g., steps described above with reference to the flow charts). In other embodiments, device 102 may be configured to perform steps described herein without the need for code. That is, for example, data processing apparatus 1302 may consist merely of one or more ASICs. Hence, the features of the embodiments described herein may be implemented in hardware and/or software.

While various embodiments of the present disclosure are described herein (including the appendices, if any), it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for a plurality of data resources allocation comprising:
   receiving a resource allocation request for allocation of the plurality of data resources, the resource allocation request specifying a set of user requirements;
   receiving an operator policy associated with the plurality of data resources, the operator policy including a plurality of policy requirements;

generating a unified model representing the plurality of data resources, the unified model comprising a plurality of adapters acting as intermediaries to the plurality of data resources;
synthesizing a resource request based on the resource allocation request and the operator policy by:
generating a user-request fragment by:
extracting the unified model;
extracting the set of user requirements from the resource allocation request; and
composing the extracted unified model and the extracted set of the user requirements to generate the user-request fragment;
generating a policy-definition fragment based on the generated user-request fragment by:
extracting the unified model;
retrieving one or more of the plurality of policy requirements from a policy inventory that correspondingly match the generated user-request fragment;
extracting the retrieved one or more of the plurality of policy requirements; and
composing the extracted unified model and the extracted one or more of the plurality of policy requirements to generate the policy-definition fragment; and
combining the generated policy-definition fragment with the generated user-request fragment to obtaining the synthesized resource request;
issuing and processing the synthesized resource request to obtain resource identifiers identifying one or more data resources that satisfy the synthesized resource request;
receiving the resource identifiers; and
allocating, based on the received resource identifiers, the one or more data resources to the resource allocation request.

2. The method of claim 1, wherein issuing the synthesized resource request to obtain resource identifiers comprises processing the synthesized resource request into a resource query and executing the resource query.

3. The method of claim 1, wherein issuing the synthesized resource request to obtain resource identifiers comprises directly executing the synthesized resource request.

4. The method according to claim 1, wherein the synthesized resource request to obtain resource identifiers comprises a computer program.

5. The method according to claim 1, wherein the set of user requirements comprise one or more of attributes, operations, and conditions related to the plurality of data resources.

6. The method according to claim 1, wherein the policy requirements depend at least in part on the resource allocation request.

7. The method according to claim 1, wherein the policy requirements comprise one or more of attributes and conditions related to the plurality of data resources.

8. The method according to claim 1, wherein the synthesized resource request is based on one or more of the user-request fragment and the policy-definition fragment.

9. The method according to claim 1, wherein the plurality of data resources comprise one or more resource components within a data center, the one or more resource components including virtual machines.

10. The method according to claim 1, wherein the plurality of data resources comprise one or more resource components within an intelligent transport system, the one or more resource components including buses.

11. A device for a plurality of data resources allocation, the device comprising:
at least one processor;
a memory to store instructions that, when executed by the at least one processor, cause the device being adapted to:
receive a resource allocation request for allocation of the plurality of data resources, the resource allocation request specifying a set of user requirements;
receive an operator policy associated with the plurality of data resources, the operator policy including a plurality of policy requirements;
generating a unified model representing the plurality of data resources, the unified model comprising a plurality of adapters acting as intermediaries to the plurality of data resources;
synthesize a resource request based on the resource allocation request and the operator policy by:
generating a user-request fragment by:
extracting the unified model;
extracting the set of user requirements from the resource allocation request; and
composing the extracted unified model and the set of the user requirements to generate the user-request fragment;
generating a policy-definition fragment based on the generated user-request fragment by:
extracting the unified model;
retrieving one or more of the plurality of policy requirements from a policy inventory that correspondingly match the generated user-request fragment;
extracting the retrieved one or more of the plurality of policy requirements; and
composing the extracted unified model and the extracted one or more of the plurality of policy requirements to generate the policy-definition fragment; and
combining the generated policy-definition fragment with the generated user-request fragment to obtain the synthesized resource request;
issuing and processing the synthesized resource request to obtain resource identifiers identifying one or more data resources that satisfy the synthesized resource request;
receiving the resource identifiers; and
allocating, based on the received resource identifiers, the one or more data resources to the resource allocation request.

12. A device for a plurality of data resources allocation, the device comprising:
at least one processor;
a receiving module, executed by the at least one processor, configured to receive a resource allocation request for allocation of the plurality of data resources, the resource allocation request specifying a set of user requirements;
the receiving module further configured to receive an operator policy associated with the plurality of data resources, the operator policy including a plurality of policy requirements;
a module, executed by the at least one processor, configured to generate a unified model representing the plurality of data resources, the unified model comprising a plurality of adapters acting as intermediaries to the plurality of data resources;

a synthesizing module, executed by the at least one processor, configured to synthesize a resource request based on the resource allocation request and the operator policy by:
  generating a user-request fragment by:
    extracting the unified model;
    extracting the set of user requirements from the resource allocation request; and
    composing the extracted unified model and the extracted set of the user requirements to generate the user-request fragment;
  generating a policy-definition fragment based on the generated user-request fragment by:
    extracting the unified model;
    retrieving one or more of the plurality of policy requirements from a policy inventory that correspondingly match the generated user-request fragment;
    extracting the retrieved one or more of the plurality of policy requirements; and
    composing the extracted unified model and the extracted one or more of the plurality of policy requirements to generate the policy-definition fragment; and
  combining the generated policy-definition fragment with the generated user-request fragment to obtaining the synthesized resource request;
issuing and processing the synthesized resource request to obtain resource identifiers identifying one or more data resources that satisfy the synthesized resource request;
receiving the resource identifiers; and
allocating, based on the received resource identifiers, the one or more data resources to the resource allocation request.

13. A computer program product, comprising a non-transitory computer readable medium storing instructions which, when executed on at least one processor, causes the at least one processor to carry out a method comprising:
  receiving a resource allocation request for allocation of a plurality of data resources, the resource allocation request specifying a set of user requirements;
  receiving an operator policy associated with the plurality of data resources, the operator policy including a plurality of policy requirements;
  generating a unified model representing the plurality of data resources, the unified model comprising a plurality of adapters acting as intermediaries to the plurality of data resources;
  synthesizing a resource request based on the resource allocation request and the operator policy by:
    generating a user-request fragment by:
      extracting the unified model;
      extracting the set of user requirements from the resource allocation request; and
      composing the extracted unified model and the extracted set of the user requirements to generate the user-request fragment;
    generating a policy-definition fragment based on the generated user-request fragment by:
      extracting the unified model;
      retrieving one or more of the plurality of policy requirements from a policy inventory that correspondingly match the generated user-request fragment;
      extracting the retrieved one or more of the plurality of policy requirements; and
      composing the extracted unified model and the extracted one or more of the plurality of policy requirements to generate the policy-definition fragment; and
    combining the generated policy-definition fragment with the generated user-request fragment to obtaining the synthesized resource request;
  issuing and processing the synthesized resource request to obtain resource identifiers identifying one or more data resources that satisfy the synthesized resource request;
  receiving the resource identifiers; and
  allocating, based on the received resource identifiers, the one or more data resources to the resource allocation request.

* * * * *